(12) United States Patent
Yamato et al.

(10) Patent No.: US 12,530,886 B2
(45) Date of Patent: Jan. 20, 2026

(54) INFORMATION PROCESSING DEVICE, METHOD FOR IDENTIFYING VISUAL RECOGNITION DIFFICULT PLACE, AND UNMANNED AERIAL VEHICLE

(71) Applicant: Rakuten Group, Inc., Tokyo (JP)

(72) Inventors: Takumi Yamato, Tokyo (JP); Takayoshi Inuma, Tokyo (JP); Daiki Tanaka, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 423 days.

(21) Appl. No.: 18/165,660

(22) Filed: Feb. 7, 2023

(65) Prior Publication Data

US 2023/0260277 A1 Aug. 17, 2023

(30) Foreign Application Priority Data

Feb. 17, 2022 (JP) ................................ 2022-022969

(51) Int. Cl.
| | |
|---|---|
| *G06V 20/10* | (2022.01) |
| *B64U 20/80* | (2023.01) |
| *G05D 1/00* | (2006.01) |
| *G06V 10/26* | (2022.01) |
| *G06V 20/17* | (2022.01) |
| *G06V 20/56* | (2022.01) |
| *B64U 101/30* | (2023.01) |

(52) U.S. Cl.
CPC ........... *G06V 20/182* (2022.01); *B64U 20/80* (2023.01); *G05D 1/042* (2013.01); *G06V 10/26* (2022.01); *G06V 20/17* (2022.01); *G06V 20/56* (2022.01); *B64U 2101/30* (2023.01)

(58) Field of Classification Search
CPC ...... G06V 20/182; G06V 10/26; G06V 20/17; G06V 20/56; G06V 20/13; B64U 20/80; B64U 2101/30; B64U 10/13; B64U 2101/32; G05D 1/042; G05D 1/0094; G01C 11/02; B64C 39/02; B64D 47/00; G06T 7/0002; G06T 7/70; G06T 7/90; G06T 2207/30181
USPC ......................................................... 382/103
See application file for complete search history.

(56) References Cited

U.S. PATENT DOCUMENTS

2008/0042866 A1* 2/2008 Morse .................... G08B 21/02
340/539.1

FOREIGN PATENT DOCUMENTS

| CN | 208636707 | * | 3/2019 |
|---|---|---|---|
| JP | 2021-060426 A | | 4/2021 |

OTHER PUBLICATIONS

Paweł Ćwiąkala, et al., "Documentation of Hiking Trails and Wooden Areas Using Unmanned Aerial Vehicles (UAV) in Tatra National Park", Polish Academy of Sciences, Cracow Branch, Infrastructure and Ecology of Rural Areas, 2017, No. 4, pp. 1545-1561 (17 pages).

(Continued)

*Primary Examiner* — Jerome Grant, II
(74) *Attorney, Agent, or Firm* — Sughrue Mion, PLLC

(57) ABSTRACT

The management server 2 acquires sensing information obtained by the UAV 1 sensing, from the sky, a scatter area where a colcothar is scattered on a mountain climbing route, identifies a state of the colcothar on the basis of the sensing information, and identifies a visual recognition difficult place on the basis of the state of the colcothar.

11 Claims, 9 Drawing Sheets

(56) References Cited

OTHER PUBLICATIONS

Shiou Yih Lee, et al., "Assessing Safety and Suitability of Old Trails for Hiking Using Ground and Drone Surveys", ISPRS International Journal of Geo-Information, 2020; vol. 9, No. 221, pp. 1-17 (17pages).

* cited by examiner

INFORMATION PROCESSING DEVICE, METHOD FOR IDENTIFYING VISUAL RECOGNITION DIFFICULT PLACE, AND UNMANNED AERIAL VEHICLE

CROSS REFERENCE TO RELATED APPLICATION

This application claims priority from Japanese Patent Application No. 2022-022969 which was filed on Feb. 17, 2022, the disclosure of which is herein incorporated by reference in its entirety.

TECHNICAL FIELD

One or more embodiments of the present invention relates to a technical field of a method or the like for causing an unmanned aerial vehicle to capture, from the sky, an image of an area where scattered material for indicating a mountain climbing route is scattered on the mountain climbing route.

RELATED ART

Conventionally, there has been known a system that notifies a climber that the climber has deviated from a climbing trail in a mountainous area to give a warning, and guide the climber along a correct route. For example, JP 2021-60426 A discloses a technique in which a plurality of guide transmitters are installed so as to be arranged discretely and in a line along a climbing trail, and signals transmitted from the guide transmitters are sequentially received by a mobile terminal of a climber by a short-range wireless communication method as the climber walks.

By the way, it is not desirable to install communication devices such as guide transmitters along the climbing trail as disclosed in JP 2021-60426 A, in terms of cost such as installation cost and maintenance cost. On the other hand, as a trail marking for indicating a mountain climbing route to climbers, for example, there is a method of scattering scattered material called colcothar on the mountain climbing route. Use of such a method can reduce cost as compared to the case where the communication devices are installed along the climbing trail. Furthermore, even in a case where the climbing trail is covered with snow, it is possible to indicate the mountain climbing route to climbers by the colcothar scattered on the snow.

However, it is sometimes difficult to visually recognize the trail marking formed by the colcothar because the trail marking blurs or disappears due to melting of snow, rainfall, generation of a depression, or the like. Therefore, it is necessary to additionally scatter the colcothar on a place that is difficult to visually recognize as the mountain climbing route. However, there is an issue in that it is not easy to identify the place.

Therefore, one or more embodiments of the present invention are to providing an information processing device, a method for identifying a visual recognition difficult place, and an unmanned aerial vehicle that are capable of easily identifying a place that is difficult to visually recognize as a mountain climbing route.

SUMMARY

In response to the above issue, an information processing device includes: at least one memory configured to store program code; and at least one processor configured to access the program code and operate as instructed by the program code. The program code includes: acquisition code configured to cause the at least one processor to acquire sensing information obtained by a sensor of an unmanned aerial vehicle sensing, from the sky, an area where scattered material for indicating a mountain climbing route is scattered on the mountain climbing route; first identification code configured to cause the at least one processor to identify a state of the scattered material on the basis of the sensing information; and second identification code configured to cause the at least one processor to identify a place that is difficult to visually recognize as the mountain climbing route on the basis of the state of the scattered material.

The state of the scattered material may indicate a degree of blurring or a degree of disappearance of the scattered material. The second identification code may cause the at least one processor to identify a place where the degree of blurring or the degree of disappearance of the scattered material satisfies one or more predetermined conditions, as the place that is difficult to visually recognize.

The program code may further include notification code configured to cause the at least one processor to notify a manager of position information of the place that is difficult to visually recognize.

The program code may further include determination code configured to cause the at least one processor to determine whether or not a depression that possibly hinders progress of a climber is generated in the place that is difficult to visually recognize.

The program code may further include notification code configured to cause the at least one processor to notify a manager of different information depending on whether it is determined that the depression is generated.

The program code may further include determination code configured to cause the at least one processor to determine, in a case where it is determined that the depression is generated, a detour that detours a place where the depression is generated in the mountain climbing route on the basis of the sensing information.

The program code may further include notification code configured to cause the at least one processor to notify a manager of position information of the determined detour.

A method for identifying a visual recognition difficult place, to be executed by one or a plurality of computers, includes: acquiring sensing information obtained by a sensor of an unmanned aerial vehicle sensing, from the sky, an area where scattered material for indicating a mountain climbing route is scattered on the mountain climbing route; identifying a state of the scattered material on the basis of the sensing information; and identifying a place that is difficult to visually recognize as the mountain climbing route on the basis of the state of the scattered material.

An unmanned aerial vehicle includes: at least one memory configured to store program code; and at least one processor configured to access the program code and operate as instructed by the program code. The program code includes: acquisition code configured to cause the at least one processor to acquire sensing information obtained by a sensor of the unmanned aerial vehicle sensing, from the sky, an area where scattered material for indicating a mountain climbing route is scattered on the mountain climbing route; first identification code configured to cause the at least one processor to identify a state of the scattered material on the basis of the sensing information; and second identification code configured to cause the at least one processor to identify a place that is difficult to visually recognize as the mountain climbing route on the basis of the state of the scattered material.

The program code may further include a control code configured to cause the at least one processor to estimate a distance from the unmanned aerial vehicle to a ground surface where the scattered material is scattered on the basis of the state of the scattered material, and use the estimated distance for flight control of the unmanned aerial vehicle.

DETAILED DESCRIPTION

Hereinafter, one or more embodiments of the present invention will be described with reference to the drawings. Incidentally, the following embodiment is an embodiment in a case where the present invention is applied to a flight management system that causes an unmanned aerial vehicle to fly in order to capture, from the sky, an image of an area where colcothar is scattered on a mountain climbing route as a trail marking. The colcothar (Bengala) assumed in the present embodiment is a kind of red pigment, and is a powdery scattered material mainly containing ferric oxide.

[1. Configuration and Operation Overview of Flight Management System S]

Figure 1:
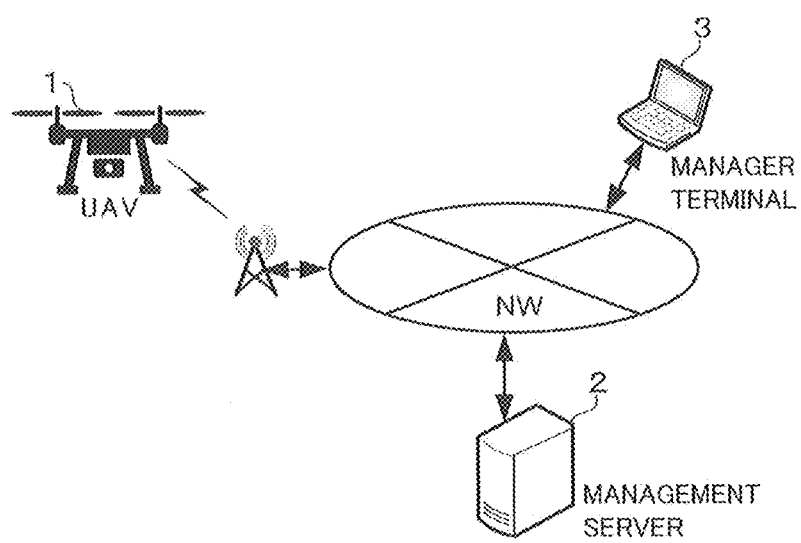
FIG. 1 is a diagram illustrating a schematic configuration example of a flight management system S.

First, a configuration and an operation overview of a flight management system S according to the present embodiment will be described with reference to FIG. 1. FIG. 1 is a diagram illustrating a schematic configuration example of the flight management system S. As illustrated in FIG. 1, the flight management system S includes an unmanned aerial vehicle (hereinafter, referred to as an "UAV (Unmanned Aerial Vehicle)") 1, a management server 2 (an example of an information processing device), and a manager terminal 3, which can be connected to a communication network NW. Here, the communication network NW includes, for example, the Internet, a mobile communication network, a radio base station thereof, and the like. The UAV 1 is also called a drone or a multi-copter. The UAV 1 can fly from the ground according to remote control by an operator or autonomously fly in the air, toward an area (hereinafter, referred to as a "scatter area") where the colcothar for indicating the mountain climbing route is scattered (for example, linearly scattered) on the mountain climbing route. The management server 2 is a server that manages the scatter area and the UAV 1 and is capable of identifying one or more places (hereinafter, referred to as a "visual recognition difficult place") that is difficult to visually recognize as the mountain climbing route in the scatter area. That is, the visual recognition difficult place is one or more places (spots) where it is difficult to visually recognize that it is the mountain climbing route in the scatter area. In other words, the visual recognition difficult place is a place with poor visibility. The manager terminal 3 is, for example, a terminal used by a manager who manages the mountain climbing route, and can access the management server 2.

Figure 2:
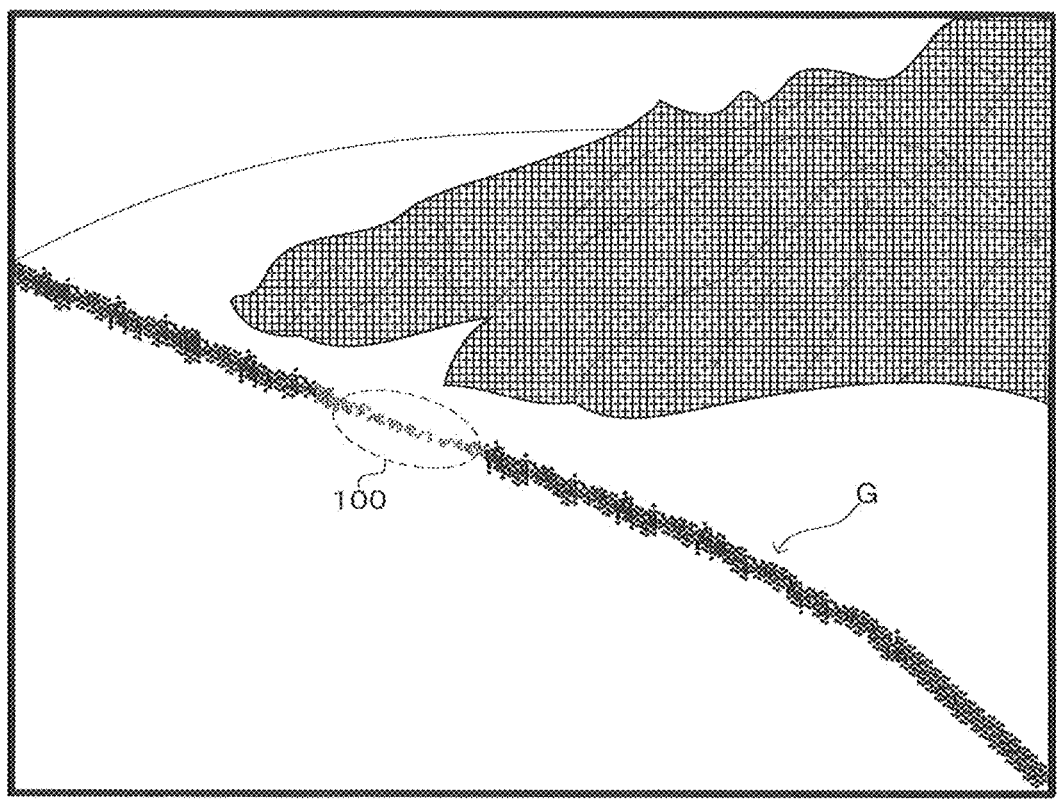
FIG. 2 is a drawing illustrating a first example of a trail marking G formed by a colcothar scattered on snow in a mountainous area.
Figure 3:
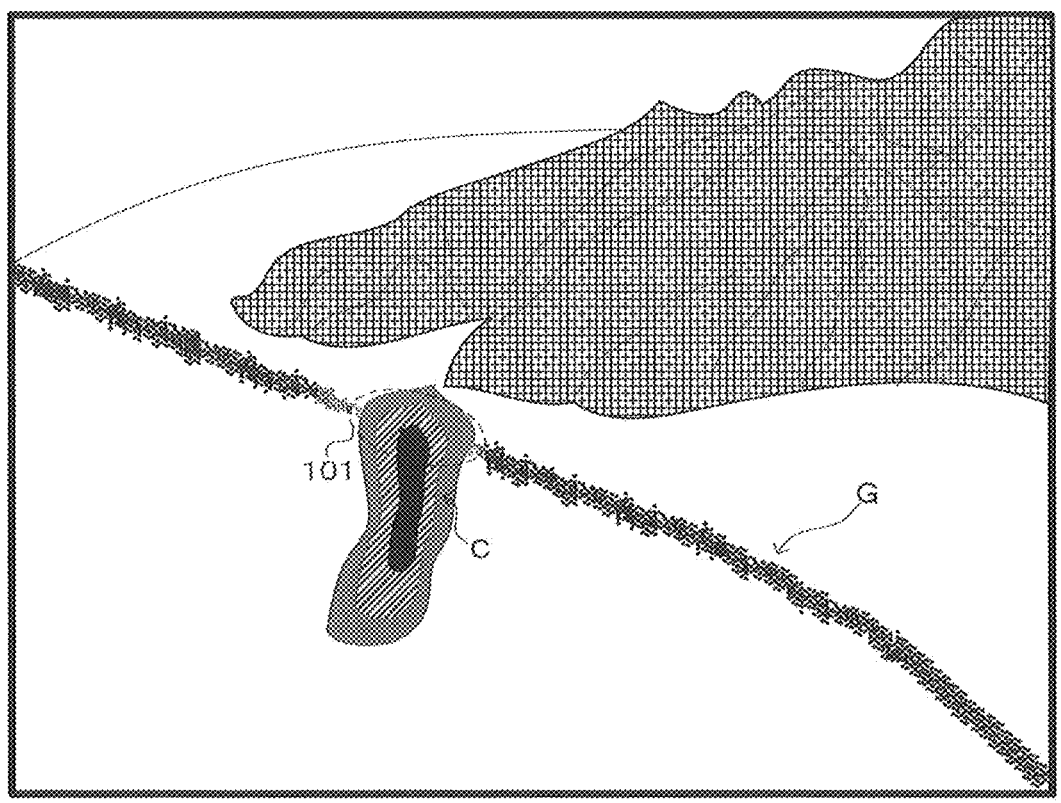
FIG. 3 is a drawing illustrating a second example of a trail marking G formed by a colcothar scattered on snow in a mountainous area.
Figure 4:
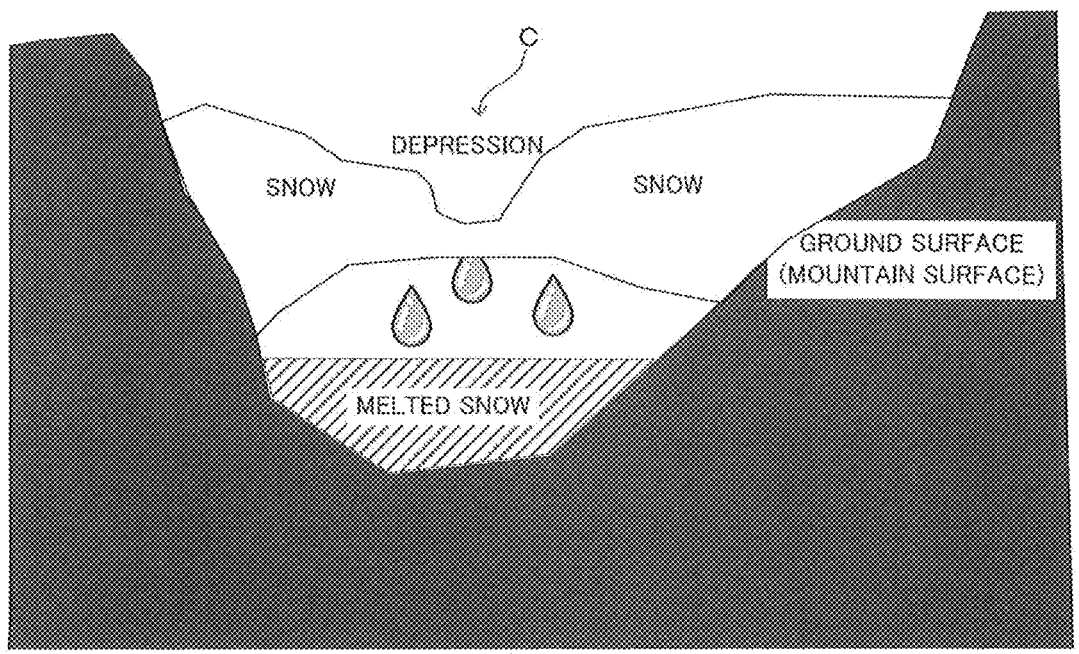
FIG. 4 is a conceptual diagram of a depression C generated on snow as viewed from the side.

FIGS. 2 and 3 are drawings illustrating first and second examples of a trail marking G formed by the colcothar scattered on snow in a mountainous area. Incidentally, the trail marking G extends over several km in total length, for example. A part of the trail marking G is shown in the examples of FIGS. 2 and 3. In the example of FIG. 2, it is difficult to visually recognize (that is, for a climber to visually recognize) a place 100 in the trail marking G as the mountain climbing route due to blurring of the colcothar. On the other hand, in the example of FIG. 3, it is difficult to visually recognize a place 101 in the trail marking G as the mountain climbing route due to a depression C. When the depression C develops to some extent (for example, develops to some extent due to a weight of snow or ice), a crevasse or the like may form. FIG. 4 is a conceptual diagram of the depression C generated on snow as viewed from the side. When the depression C illustrated in FIG. 4 develops, the crevasse or the like may form to hinder progress of the climber. Therefore, it is desirable for the climber to detour the place where the depression C is generated in the trail marking G.

[1-1. Configuration and Function of UAV 1]

Figure 5:
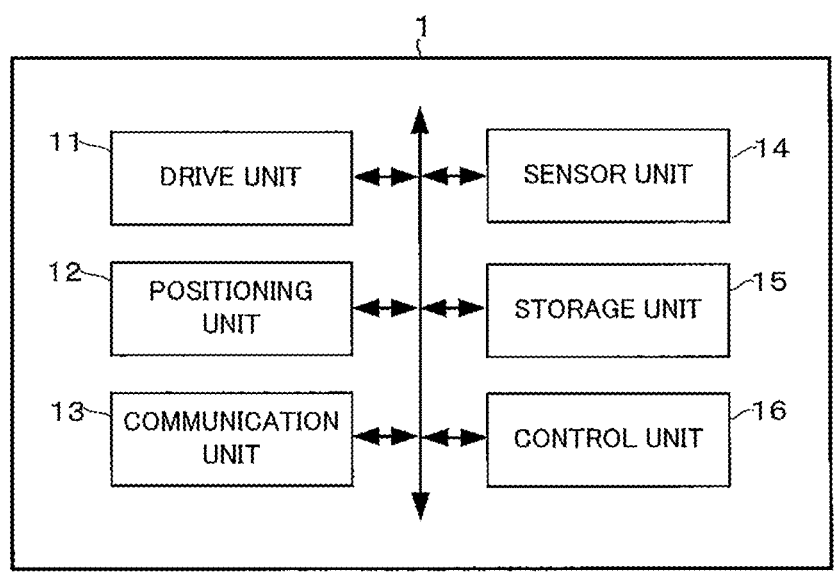
FIG. 5 is a diagram illustrating a schematic configuration example of an UAV 1.

Next, a configuration and a function of the UAV 1 will be described with reference to FIG. 5. FIG. 5 is a diagram illustrating a schematic configuration example of the UAV 1. As illustrated in FIG. 5, the UAV 1 includes a drive unit 11, a positioning unit 12, a communication unit 13, a sensor unit 14, a storage unit 15, a control unit 16 (an example of a computer), and the like. Furthermore, the UAV 1 includes a battery (not illustrated) that supplies power to each unit of the UAV 1, and a rotor (propeller) that is a horizontal rotary wing. Incidentally, the UAV 1 may include a holding mechanism or the like for holding an article.

The drive unit 11 includes a motor, a rotation shaft, and the like. The drive unit 11 rotates a plurality of rotors by the motor, the rotation shaft, and the like that are driven in accordance with a control signal output from the control unit 16. The positioning unit 12 includes a radio wave receiver, an altitude sensor, and the like. The positioning unit 12 receives, for example, a radio wave transmitted from a GNSS (Global Navigation Satellite System) satellite by the radio wave receiver, and detects a current position (latitude and longitude) of the UAV 1 in a horizontal direction on the basis of the radio wave. Incidentally, the current position of the UAV 1 in the horizontal direction may be corrected on the basis of an image captured by a camera of the sensor unit 14. Moreover, the current position of the UAV 1 in the horizontal direction may be corrected by an RTK (Real Time Kinematic) method using the radio wave received by a reference station (reference station capable of communicating with the UAV 1) whose installation position is identified. Position information indicating the current position detected by the positioning unit 12 is output to the control unit 16. Furthermore, the positioning unit 12 may detect a current position (altitude) of the UAV 1 in a vertical direction by the altitude sensor such as an atmospheric pressure sensor. In this case, the position information includes altitude information indicating the altitude of the UAV 1.

The communication unit 13 has a wireless communication function and controls communication performed via the communication network NW. The sensor unit 14 includes various sensors used for flight control of the UAV 1. Examples of the various sensors include an optical sensor, a triaxial angular velocity sensor, a triaxial acceleration sensor, and a geomagnetic sensor. The optical sensor includes a camera (for example, an RGB camera), and continuously senses a real space within a sensing range (for example, a range that falls within an angle of view of the camera). Here, the sensing means, for example, measuring, imaging, or sensing some amount (for example, a physical quantity). Moreover, the optical sensor includes a LiDAR (Light Detection and Ranging, or Laser Imaging Detection and Ranging) sensor that measures a distance to a ground surface. Sensing information obtained by the sensing by the sensor unit 14 is output to the control unit 16. The sensing information includes, for example, an image (for example, an RGB image and a distance image) sensed by the optical sensor.

The storage unit 15 includes a nonvolatile memory or the like, and stores various programs and data. Moreover, the storage unit 15 stores a vehicle ID (identification information) for identifying the UAV 1. The control unit 16 includes at least one CPU (Central Processing Unit), a ROM (Read Only Memory), a RAM (Random Access Memory), and the like, and executes various types of control according to a program stored in the ROM (or the storage unit 15). For example, the control unit 16 performs flight control to cause the UAV 1 to fly. In this flight control, a rotation speed of the rotors, and a position, an attitude, and a traveling direction of the UAV 1 are controlled using the position information acquired from the positioning unit 12, the sensing information acquired from the sensor unit 14, scatter area information indicating the scatter area, and the like. As a result, the UAV 1 can autonomously move to an end of the scatter area. At this time, the control unit 16 performs the flight control so that the UAV 1 does not come into contact with the ground surface (particularly, a mountain surface) by recognizing the distance (for example, the distance measured by the LiDAR sensor) from the UAV 1 to the ground surface (particularly, the mountain surface). Incidentally, the scatter area information includes position information indicating a position (latitude and longitude) of the end of the scatter area (for example, an end of the scattered colcothar). The scatter area information may be set at a departure point (flight start point) in the UAV 1, or may be set by being transmitted from the management server 2.

When the UAV 1 arrives at the end of the scatter area, the control unit 16 causes the sensor unit 14 to sense the sensing range from the sky, and acquires the sensing information obtained by the sensing. The control unit 16 detects, as the trail marking, a portion where the colcothar color (for example, dark reddish brown) extends linearly from the RGB image included in the acquired sensing information. Incidentally, the colcothar color is preset, for example, in a range of RGB values. The control unit 16 causes the sensor unit 14 to continuously sense the sensing range including the trail marking in time series while performing the flight control so that the UAV 1 flies along the detected trail marking, and acquires the sensing information obtained by the sensing. The sensing information acquired in this manner is transmitted to the management server 2 by the communication unit 13 together with the position information of the UAV 1 and the vehicle ID of the UAV 1.

[1-2. Configuration and Function of Management Server 2]

Figure 6:
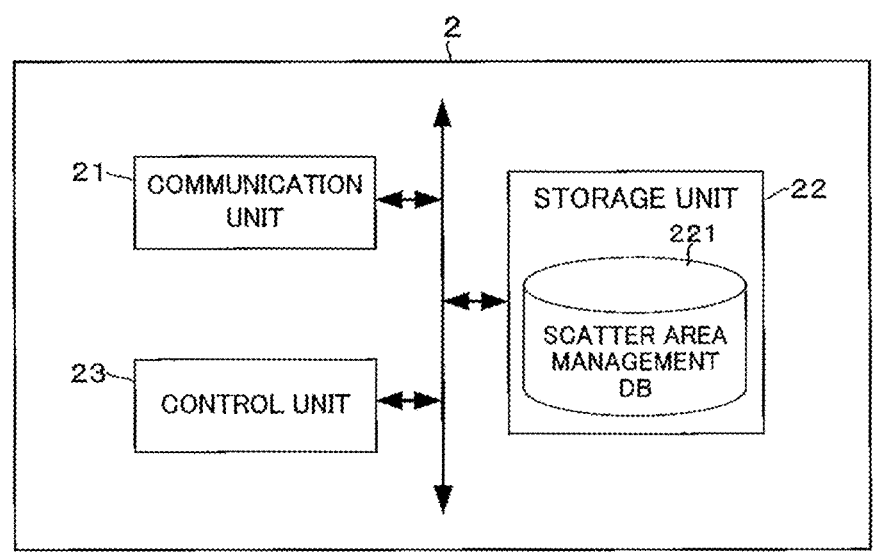
FIG. 6 is a diagram illustrating a schematic configuration example of a management server 2.

Next, a configuration and a function of the management server 2 will be described with reference to FIG. 6. FIG. 6 is a diagram illustrating a schematic configuration example of the management server 2. As illustrated in FIG. 6, the management server 2 includes a communication unit 21, a storage unit 22, a control unit 23 (an example of the computer), and the like. The communication unit 21 controls communication performed via the communication network NW. The sensing information, the position information, and the vehicle ID transmitted from the UAV 1 are received by the communication unit 21. The management server 2 can recognize the current position of the UAV 1 from the position information of the UAV 1. The storage unit 22 includes, for example, a hard disk drive or the like, and stores various programs and data. Moreover, in the storage unit 22, a scatter area management database 221 or the like is constructed.

The scatter area management database 221 is a database for managing information related to the scatter area. In the scatter area management database 221, the scatter area information, manager information, and the like are stored (registered) in association with one another. Here, the scatter area information may include position information indicating a position along the mountain climbing route in the scatter area, instead of the position information indicating the position of the end of the scatter area. The manager information includes, for example, a manager ID for identifying the manager who manages the mountain climbing route, an e-mail address of the manager, and a telephone number of the manager. Moreover, the manager information may include an AID for identifying a notification application installed in the manager terminal 3 of the manager.

The control unit 23 includes at least one CPU, a ROM, a RAM, and the like, and performs various processes according to the programs (program code) stored in the ROM or the storage unit 22. The CPU (an example of processor) is configured to access the program code stored in the ROM or the storage unit 22 and operate as instructed by the program code. The program code includes: acquisition code configured to cause the CPU to acquire sensing information obtained by the sensor of UAV 1 sensing, from the sky, an area where a colcothar for indicating a mountain climbing route is scattered on the mountain climbing route; first identification code configured to cause the CPU to identify a state of the colcothar on the basis of the sensing information; and second identification code configured to cause the CPU to identify a place that is difficult to visually recognize as the mountain climbing route on the basis of the state of the colcothar. Here, the second identification code may cause the CPU to identify, on the basis of the state of the colcothar, at least one location for notification as a place that is difficult to visually recognize as the mountain climbing route. The second identification code may cause the CPU to identify the at least one location in response to determining that the degree of blurring or the degree of disappearance of the colcothar at the at least one location satisfies one or more predetermined conditions. The one or more predetermined conditions may include that the degree of blurring and/or the degree of disappearance of the scattered material is equal to or more than a threshold value, and the at least one location may be identified on the basis that it has a predetermined length and/or a predetermined area or more. The program code may further include notification code configured to cause the CPU to notify a manager of position information of the place that is difficult to visually recognize. The program code may further include determination code configured to cause the CPU to determine whether or not a depression having one or more predetermined characteristics is present in the one or more locations. The determination code may cause the CPU to determine whether or not a depression that possibly hinders progress of a climber is generated in the place that is difficult to visually recognize. The program code may further include notification code configured to cause the CPU to notify a manager of different information depending on whether it is determined that the depression is generated. The program code may further include determination code configured to cause the CPU to determine, in a case where it is determined that the depression is generated, a detour that detours a place where the depression is generated in the mountain climbing route on the basis of the sensing information. The program code may further include notification code configured to cause the CPU to notify a manager of position information of the determined detour.

Figure 7:
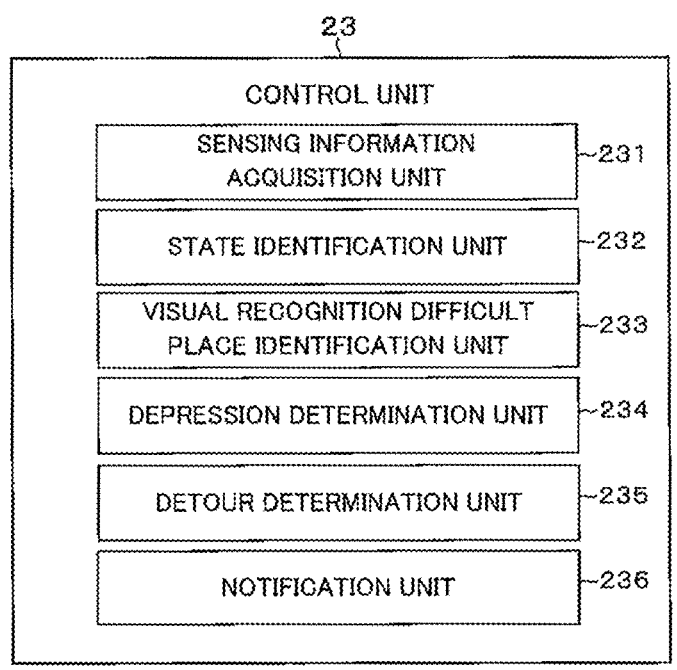
FIG. 7 is a diagram illustrating an example of a functional block in a control unit 23.

FIG. 7 is a diagram illustrating an example of a functional block in the control unit 23. For example, in accordance with a program (program code group) stored in the ROM or the storage unit 22, the control unit 23 functions as a sensing information acquisition unit 231, a state identification unit 232, a visual recognition difficult place identification unit 233, a depression determination unit 234, a detour determination unit 235, a notification unit 236, and the like as illustrated in FIG. 7.

The sensing information acquisition unit 231 acquires the sensing information obtained by the sensor unit 14 of the UAV 1 sensing the scatter area from the sky, from the UAV 1 via the communication unit 21. The state identification unit 232 identifies a state of the colcothar on the basis of the sensing information acquired by the sensing information acquisition unit 231. Here, the state of the colcothar indicates a degree of blurring or a degree of disappearance of the colcothar. For example, the state identification unit 232 identifies the state of the colcothar by detecting the portion where the colcothar color extends linearly as the trail marking from the RGB image included in the sensing information acquired by the sensing information acquisition unit 231, and calculating color (shade) distribution or point cloud density in the trail marking. Incidentally, the darker the colcothar color, the smaller the degree of blurring of the colcothar or the degree of disappearance of the colcothar. Moreover, the greater the point cloud density of the colcothar, the smaller the degree of blurring of the colcothar or the degree of disappearance of the colcothar.

The visual recognition difficult place identification unit 233 identifies the visual recognition difficult place in the detected trail marking on the basis of the state of the colcothar identified by the state identification unit 232. For example, the visual recognition difficult place identification unit 233 identifies, as the visual recognition difficult place, a place where the degree of blurring or the degree of disappearance of the colcothar satisfies one or more predetermined conditions in the detected trail marking. This makes it possible to quickly and easily identify the visual recognition difficult place. Here, the predetermined conditions are, for example, such the conditions that the place has a degree of blurring or disappearance of the colcothar equal to or more than a threshold value (that is, the place has a high degree of blurring or disappearance) and also has a predetermined length (or a predetermined area) or more. For example, the visual recognition difficult place identification unit 233 identifies, as the visual recognition difficult place, the place where the degree of blurring or the degree of disappearance of the colcothar is equal to or more than a threshold value, the place further having a predetermined length or a predetermined area or more. The predetermined length (or the predetermined area) is not particularly limited, but is set to a length (size) that is expected to be difficult for the climber to visually recognize. For example, suppose that the predetermined length is 3 m. In this case, a place having the degree of blurring of the colcothar equal to or more than the threshold value (that is, a place where the colcothar color blurs to become lighter), but having a length less than 3 m does not satisfy the predetermined condition, and thus is not identified as the visual recognition difficult place. As a result, it is possible to avoid excessive identification of the visual recognition difficult place.

The depression determination unit 234 determines whether or not a depression that possibly hinders the progress of the climber has been generated (that is, such a depression is present) in the visual recognition difficult place identified by the visual recognition difficult place identification unit 233. As a result, it is possible to quickly identify a place having a high formation probability of a crevasse or the like from the visual recognition difficult place. For example, in a case where characteristics of the depression that possibly hinders the progress of the climber can be extracted in the identified visual recognition difficult place and its surrounding range, the depression determination unit 234 determines that the depression (for example, the depression having a high formation probability of a crevasse or the like) that possibly hinders the progress of the climber has been generated (that is, such a depression is present). Here, the characteristics of the depression that possibly hinders the progress of the climber are set in advance by, for example, an image representing a color, a shape, and a size of the depression (alternatively, a pattern, a shape, and a size of the depression). The shape of the depression is a three-dimensional shape. The three-dimensional shape from the sensing information can be identified, for example, by performing SLAM (Simultaneous Localization and Mapping) processing on a distance image of the identified visual recognition difficult place and its surrounding range. Incidentally, whether or not the depression is generated (that is, the depression is present) may be estimated from a learned model learned in advance. In this case, by inputting the image of the identified visual recognition difficult place and its surrounding range to the learned model, it is possible to obtain whether or not the depression that possibly hinders the progress of the climber is generated, as output from the learned model. Thus, it is possible to accurately identify the depression and its range.

Figure 8:
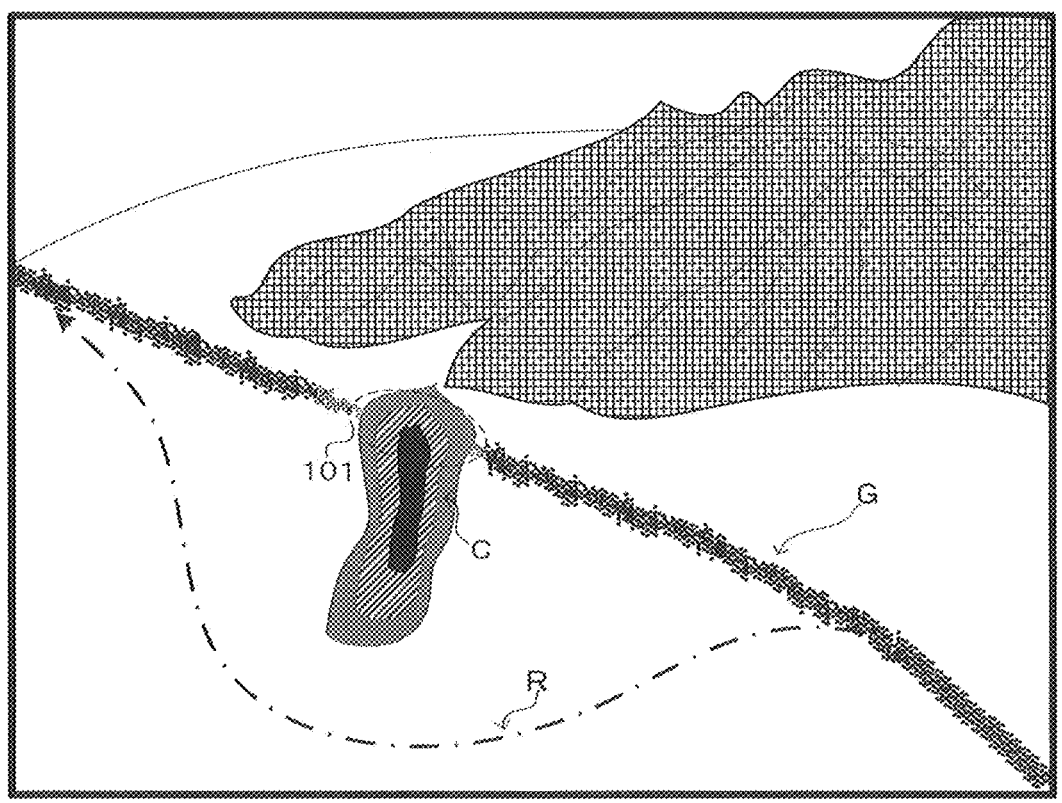
FIG. 8 is a drawing illustrating an example of a detour R that detours a place where the depression C is generated in the trail marking G.

In a case where the depression determination unit 234 determines that the depression has been generated, the detour determination unit 235 determines (in other words, sets) a detour that detours the place where the depression is generated in the trail marking on the basis of the sensing information acquired by the sensing information acquisition unit 231. As a result, it is possible to quickly determine the detour that detours the place where the depression identified from the visual recognition difficult place is generated. FIG. 8 is a drawing illustrating an example of a detour R that detours the place where the depression C is generated in the trail marking G. In the example of FIG. 8, the detour R is illustrated that detours the place where the depression C is generated, from a position before reaching the depression C (that is, a position with a certain margin), the position being separated from the depression C by a predetermined distance or more in the trail marking G. Such a predetermined distance is set according to the size of the depression C.

The notification unit 236 notifies a manager of visual recognition difficult place information related to the visual recognition difficult place identified by the visual recognition difficult place identification unit 233, the manager managing the mountain climbing route having the visual recognition difficult place. Here, the visual recognition difficult place information includes, for example, position information indicating a position of the visual recognition difficult place. As a result, it is possible to cause the manager to quickly grasp the visual recognition difficult place, and it is possible to reduce a burden of monitoring the mountain climbing route by the manager. The visual recognition difficult place information may be notified by transmitting an e-mail describing the visual recognition difficult place information to the e-mail address of the manager, or by transmitting the visual recognition difficult place information to the phone number of the manager by SMS (Short Message Service). As a result, the visual recognition difficult place information is acquired by and displayed on the manager terminal 3 of the manager. For example, a map indicating the position of the visual recognition difficult place may be displayed on the manager terminal 3 of the manager. Moreover, the visual recognition difficult place information may be notified by delivering the visual recognition difficult place information by push notification (to the AID) to the notification application resident in the manager terminal 3 of the manager. In this case, the visual recognition difficult place information is displayed on the manager terminal 3 of the manager as well. Incidentally, the manager terminal 3 of the manager may instruct a scatter UAV equipped with a colcothar scatter machine to automatically scatter the colcothar on the visual recognition difficult place. As a result, it is possible to quickly restore the trail marking indicating the mountain climbing route.

Moreover, the visual recognition difficult place information may include information related to the depression that possibly hinders the progress of the climber at the visual recognition difficult place identified by the visual recognition difficult place identification unit 233. That is, the notification unit 236 notifies the manager of different information depending on whether or not it is determined that the depression that possibly hinders the progress of the climber has been generated. As a result, it is possible to not only restore the trail marking, but also to cause the manager to quickly grasp that it is necessary to reconstruct the mountain climbing route (for example, to determine the detour). Moreover, the information related to the depression may include position information indicating a position of the detour determined by the detour determination unit 235. As a result, it is possible to quickly propose the detour that detours the place where the depression is generated to the manager, and it is possible to reduce a burden of managing the mountain climbing route by the manager. In this case, a map indicating the detour is displayed on the manager terminal 3 of the manager. Incidentally, in a case where the manager is notified of the position information of the detour, the manager terminal 3 of the manager may instruct the scatter UAV equipped with the colcothar scatter machine to automatically scatter the colcothar on the detour. This makes it possible to quickly reconstruct the trail marking.

Figure 9:
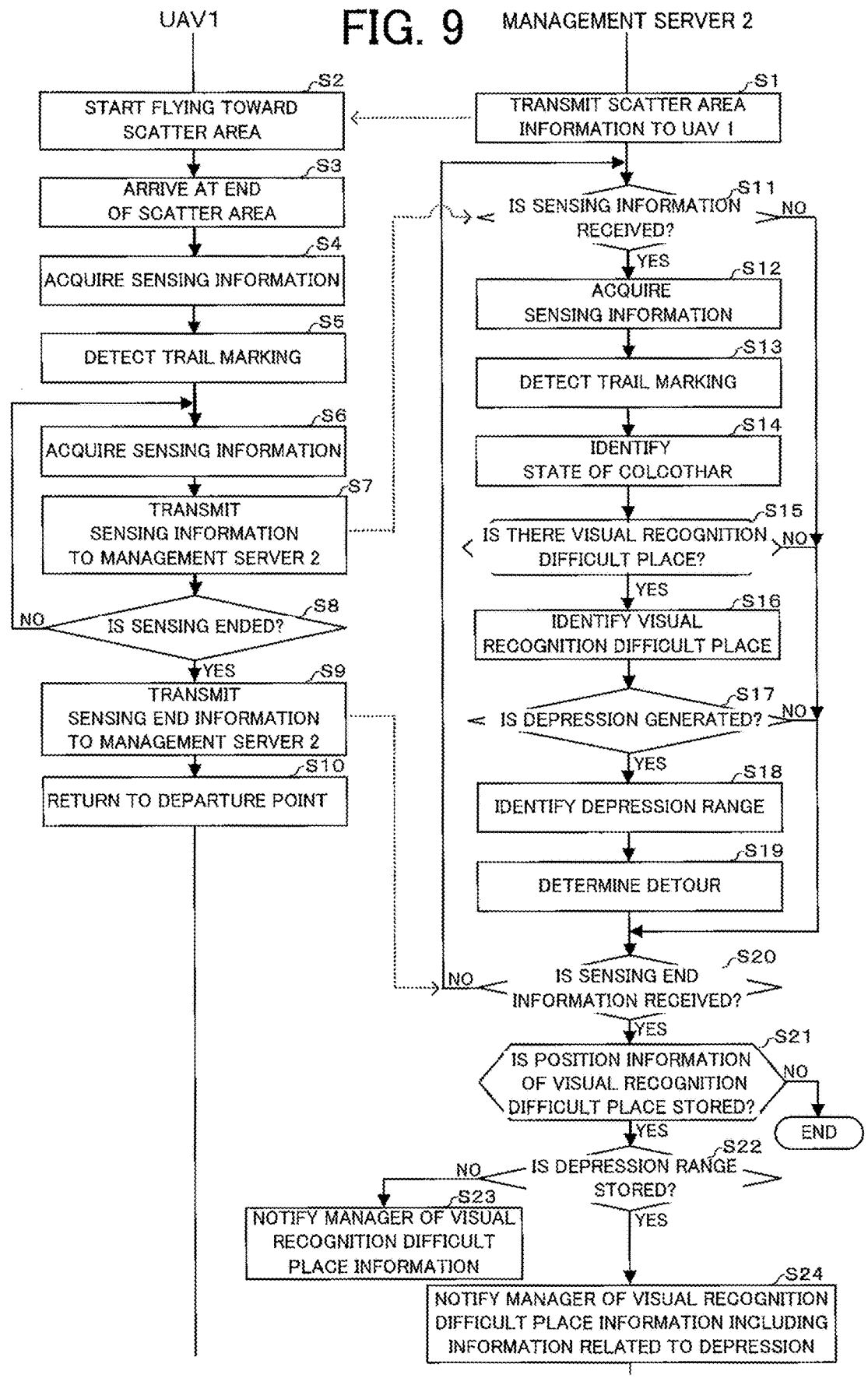
FIG. 9 is a sequence diagram illustrating an example of processing executed between the UAV 1 and the management server 2 in the flight management system S.

[2. Operation of Flight Management System S] Next, an operation of the flight management system S will be described with reference to FIG. 9. FIG. 9 is a sequence diagram illustrating an example of processing executed between the UAV 1 and the management server 2 in the flight management system S. In FIG. 9, the management server 2 transmits the scatter area information including a sensing command of the scatter area to the UAV 1 via the communication network NW (step S1).

Next, upon acquiring (receiving) the scatter area information from the management server 2, the UAV 1 starts flying from the departure point toward the scatter area (step S2). Subsequently, when arriving at the end of the scatter area (step S3), the UAV 1 activates the sensor unit 14 to start sensing a lower area, and acquires the sensing information obtained by the sensing (step S4).

Next, the UAV 1 detects the trail marking (for example, a start point of the trail marking) on the basis of the sensing information acquired at step S4 (step S5). For example, from the RGB image included in the sensing information, the portion where the colcothar color extends linearly is detected as the trail marking. Subsequently, while flying along the trail marking detected at step S5, the UAV 1 senses a range including the trail marking (for example, from the start point of the trail marking), and acquires the sensing information obtained by the sensing (step S6). The UAV 1 then transmits the sensing information acquired at step S6, and the position information and the vehicle ID of the UAV 1 (hereinafter referred to as "sensing information and the like") to the management server 2 (step S7). Incidentally, the sensing information and the like may include position information indicating a position of the trail marking detected at step S5.

Next, the UAV 1 determines whether or not to end the sensing (step S8). For example, in a case where an end point of the mountain climbing route indicated by the scatter area information is sensed, in a case where the UAV 1 comes out of the sensing range indicated by the scatter area information, or in a case where an end point of the trail marking is detected on the basis of the sensing information, it is determined to end the sensing (step S8: YES). In these cases, the UAV 1 transmits sensing end information indicating the end of the sensing to the management server 2 (step S9), and returns to the departure point, for example (step S10). On the other hand, in a case where it is determined not to end the sensing (step S8: NO), the processing returns to step S6, and the sensing of the range including the trail marking is continued. In this manner, the sensing is continuously performed along the trail marking, and the sensing information obtained by the sensing is sequentially transmitted to the management server 2.

On the other hand, the management server 2 determines whether or not the sensing information and the like have been received from the UAV 1 (step S11). In a case where it is determined that the sensing information and the like have been received (step S11: YES), the sensing information and the like are acquired by the sensing information acquisition unit 231 (step S12), and the processing proceeds to step S13. On the other hand, in a case where it is determined that the sensing information and the like have not been received (step S11: NO), the processing proceeds to step S20.

At step S13, the management server 2 detects the trail marking (for example, the start point of the trail marking) on the basis of the sensing information acquired at step S12. For example, from the RGB image included in the sensing information, the portion where the colcothar color extends linearly is detected as the trail marking. Incidentally, in a case where the sensing information includes the position information of the trail marking, the trail marking may be detected on the basis of the position information of the trail marking. Subsequently, the management server 2 causes the state identification unit 232 to identify the state of the colcothar (for example, the state indicating the degree of blurring or the degree of disappearance of the colcothar) in the trail marking detected at step S13 (step S14).

Next, the management server 2 determines whether or not the trail marking detected at step S13 includes the visual recognition difficult place on the basis of the state of the colcothar identified at step S14 (step S15). In a case where it is determined that the visual recognition difficult place is included (step S15: YES), the visual recognition difficult place is identified by the visual recognition difficult place identification unit 233 (step S16). For example, the place where the degree of blurring or the degree of disappearance of the colcothar satisfies the predetermined conditions in the detected trail marking is identified as the visual recognition difficult place. At this time, the position information of the visual recognition difficult place is stored in the storage unit 22. Incidentally, the position information of the visual recognition difficult place is identified on the basis of, for example, the scatter area information and the position information of the UAV 1. Thereafter, the processing proceeds to step S17. On the other hand, in a case where it is determined that there is no visual recognition difficult place (step S15: NO), the processing proceeds to step S20.

At step S17, the management server 2 causes the depression determination unit 234 to determine whether or not the depression that possibly hinders the progress of the climber has been generated (that is, the depression is present) in the visual recognition difficult place identified at step S16. In a case where it is determined that the depression that possibly hinders the progress of the climber has been generated (that is, the depression is present) (step S17: YES), the depression range is identified from the image included in the sensing information acquired at step S12 (step S18). Here, the depression range is, for example, a range including the depression identified at step S18 and expanded outward from the depression by a predetermined distance (distance in consideration of a margin). The identified depression range is stored in the storage unit 22 in association with the position information of the visual recognition difficult place. Thereafter, the processing proceeds to step S19. On the other hand, in a case where it is determined that the depression that possibly hinders the progress of the climber has not been generated (step S17: NO), the processing proceeds to step S20.

At step S19, the management server 2 determines the detour that detours the depression range identified at step S18 on the basis of the sensing information acquired at step S12. At this time, the position information of the determined detour is stored in the storage unit 22 in association with the position information of the visual recognition difficult place. Thereafter, the processing proceeds to step S20. At step S20, the management server 2 determines whether or not the sensing end information has been received from the UAV 1. In a case where it is determined that the sensing end information has been received (step S20: YES), the processing proceeds to step S21. On the other hand, in a case where it is determined that the sensing end information has not been received (step S20: NO), the processing returns to step S11, and the management server 2 waits for reception of the sensing information and the like of a next section.

At step S21, the management server 2 determines whether or not the position information of the visual recognition difficult place has been stored in the above processing. In a case where it is determined that the position information of the visual recognition difficult place has been stored (step S21: YES), the position information of the visual recognition difficult place is acquired, and the processing proceeds to step S22. Here, in a case where the visual recognition difficult place is identified at a plurality of positions in the trail marking, the position information of each of the visual recognition difficult places is acquired. On the other hand, in a case where it is determined that the position information of the visual recognition difficult place has not been stored (step S21: NO), the processing ends.

At step S22, the management server 2 determines whether or not the depression range has been stored in the above processing. In a case where it is determined that the depression range has been stored (step S22: YES), the position information of the depression range and the detour is acquired, and the processing proceeds to step S24. Here, in a case where the depression range is identified at a plurality of positions in the trail marking, the position information of each of the depression ranges and the detours is acquired. On the other hand, in a case where it is determined that the depression range has not been stored (step S22: NO), the processing proceeds to step S23.

At step S23, the management server 2 notifies a manager of the visual recognition difficult place information including the acquired position information of the visual recognition difficult place, the manager managing the mountain climbing route having the visual recognition difficult place. On the other hand, at step S24, the management server 2 notifies a manager of the visual recognition difficult place information including the acquired position information of the visual recognition difficult place and the information related to the depression, the manager managing the mountain climbing route having the visual recognition difficult place. Here, the information related to the depression includes, for example, the range of the depression and the position information of the detour.

Incidentally, the processing of steps S13 to S19 may be collectively executed after the sensing information for all sections of the trail marking is received from the UAV 1 (that is, after the sensing end information is received at step S20).

As described above, according to the above embodiment, the management server 2 acquires the sensing information obtained by the UAV 1 sensing, from the sky, the scatter area where the colcothar is scattered on the mountain climbing route, identifies the state of the colcothar on the basis of the sensing information, and identifies the visual recognition difficult place on the basis of the state of the colcothar. Therefore, it is possible to easily identify the visual recognition difficult place in the trail marking. Furthermore, since the management server 2 notifies the manager of the visual recognition difficult place information, it is possible to reduce the burden of monitoring the mountain climbing route by the manager.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the above embodiment, the management server 2 is configured to identify the state of the colcothar on the basis of the sensing information and identify the visual recognition difficult place on the basis of the state of the colcothar. However, such processing may be performed by the UAV 1. In this case, the control unit 16 (an example of the information processing device) of the UAV 1 functions as the state identification unit 232, the visual recognition difficult place identification unit 233, the depression determination unit 234, the detour determination unit 235, and the notification unit 236 described above, and the control unit 16 performs the processing of steps S13 to S19 and steps S21 to S24 illustrated in FIG. 9. In this case, the management server 2 transmits the scatter area information and the manager information to the UAV 1 at step S1. Moreover, in the above embodiment, the example in which the colcothar is used as the scattered material has been described, but scattered material other than the colcothar may be used.

Moreover, in the above embodiment, the control unit 16 of the UAV 1 performs the flight control so that the UAV 1 does not come into contact with the ground surface by recognizing the distance to the ground surface. However, in a case where the UAV 1 flies over snow, light emitted from the UAV 1 for distance measurement is irregularly reflected on the ground surface with snow. Thus, there is an issue in that the distance from the UAV 1 to the ground surface cannot be accurately measured. In order to solve such an issue, the control unit 16 of the UAV 1 identifies the state of the colcothar on the basis of the sensing information, estimate the distance (altitude from the ground surface) from the UAV 1 to the ground surface where the colcothar is scattered on the basis of the state of the colcothar, and use the estimated distance for the flight control of the UAV 1. More specifically, the control unit 16 of the UAV 1 measures the distance on the basis of reflected light from a place where the degree of blurring or the degree of disappearance of the colcothar is less than the threshold value in the detected trail marking. As a result, the UAV 1 can fly on the basis of a more accurate distance to the ground surface. Incidentally, a learned model may be generated by learning a relationship between the state of the colcothar and the distance from the colcothar. Such a learned model is used particularly by an additional scatter UAV equipped with a colcothar scatter machine. That is, the additional scatter UAV identifies the state of the colcothar on the basis of the sensing information, obtains the distance from the colcothar as output from the learned model by inputting the state of the colcothar to the learned model, and additionally scatters the colcothar on the visual recognition difficult place while performing the flight control using the distance.

REFERENCE SIGNS LIST

1 UAV
2 Management server
11 Drive unit
12 Positioning unit
13 Communication unit
14 Sensor unit
15 Storage unit
16 Control unit
21 Communication unit
22 Storage unit
23 Control unit
231 Sensing information acquisition unit
232 State identification unit
233 Visual recognition difficult place identification unit
234 Depression determination unit
235 Detour determination unit
236 Notification unit
S Flight Management system

What is claimed is:

1. An information processing device comprising:
at least one memory configured to store program code; and at least one processor configured to access the program code and operate as instructed by the program code, the program code including:
acquisition code configured to cause the at least one processor to acquire sensing information obtained by a sensor of an unmanned aerial vehicle sensing, from the sky, an area where scattered material for indicating a mountain climbing route is scattered on the mountain climbing route;
first identification code configured to cause the at least one processor to identify a state of the scattered material indicating a degree of blurring or a degree of disappearance of the scattered material on the basis of the sensing information; and
second identification code configured to cause the at least one processor to identify a place that is difficult to visually recognize as the mountain climbing route on the basis of the state of the scattered material.

2. The information processing device according to claim 1,
wherein the second identification code causes the at least one processor to identify a place where the degree of blurring or the degree of disappearance of the scattered material satisfies one or more predetermined conditions, as the place that is difficult to visually recognize.

3. The information processing device according to claim 2,
the second identification code causes the at least one processor to identify the place where the degree of blurring or the degree of disappearance of the scattered material is equal to or more than a threshold value, the place further having a predetermined length or a predetermined area or more.

4. The information processing device according to claim 1, the program code further including notification code configured to cause the at least one processor to notify a manager of position information of the place that is difficult to visually recognize.

5. The information processing device according to claim 1, the program code further including determination code configured to cause the at least one processor to determine whether or not a depression that possibly hinders progress of a climber is generated in the place that is difficult to visually recognize.

6. The information processing device according to claim 5, the program code further including notification code configured to cause the at least one processor to notify a manager of different information depending on whether it is determined that the depression is generated.

7. The information processing device according to claim 5, the program code further including determination code configured to cause the at least one processor to determine, in a case where it is determined that the depression is generated, a detour that detours a place where the depression is generated in the mountain climbing route on the basis of the sensing information.

8. The information processing device according to claim 7, the program code further including notification code configured to cause the at least one processor to notify a manager of position information of the determined detour.

9. A method for identifying a visual recognition difficult place, to be executed by one or a plurality of computers, the method comprising:
acquiring sensing information obtained by a sensor of an unmanned aerial vehicle sensing, from the sky, an area where scattered material for indicating a mountain climbing route is scattered on the mountain climbing route;

identifying a state of the scattered material indicating a degree of blurring or a degree of disappearance of the scattered material on the basis of the sensing information; and identifying a place that is difficult to visually recognize as the mountain climbing route on the basis of the state of the scattered material.

10. An unmanned aerial vehicle comprising:

at least one memory configured to store program code; and at least one processor configured to access the program code and operate as instructed by the program code, the program code including:

acquisition code configured to cause the at least one processor to acquire sensing information obtained by a sensor of the unmanned aerial vehicle sensing, from the sky, an area where scattered material for indicating a mountain climbing route is scattered on the mountain climbing route;

first identification code configured to cause the at least one processor to identify a state of the scattered material indicating a degree of blurring or a degree of disappearance of the scattered material on the basis of the sensing information; and second identification code configured to cause the at least one processor to identify a place that is difficult to visually recognize as the mountain climbing route on the basis of the state of the scattered material.

11. The unmanned aerial vehicle according to claim 10, the program code further including a control code configured to cause the at least one processor to estimate a distance from the unmanned aerial vehicle to a ground surface where the scattered material is scattered on the basis of the state of the scattered material, and use the estimated distance for flight control of the unmanned aerial vehicle.

\* \* \* \* \*